Patented Jan. 19, 1954

2,666,694

UNITED STATES PATENT OFFICE 2,666,694

PROCESS FOR TREATING PLASTIC ARTICLES

Robert B. Battersby, Auburn, N. Y., assignor to PM Industries, Incorporated, Stamford, Conn.

No Drawing. Application January 24, 1952, Serial No. 268,130

3 Claims. (Cl. 41—42)

This invention relates to a process for the production of a characteristic surface on molded or otherwise formed plastic articles.

In particular it relates to a method for bringing to the surface one or more of the ingredients of a molded plastic composition containnig a filler material by etching the surface thereof or mechanically treating it to expose some of the filler.

It is an object of this invention to produce a soft, smooth, but not slippery surface on plastic and other molded objects by chemical means.

It is still another object of this invention to produce a characteristic surface on various objects by molding the objects from a thermoplastic or thermo-setting composition that contains a filler and then mechanically treating or etching the surface to expose the filler, and thereby produce a novel and attractive surface having a characteristic appearance and texture.

Plastics have found a use in many fields and would be used to produce molded objects for many useful purposes if the characteristics of the surface of the molded object could be modified over all or part of the object so that it would have a surface that would allow its use in various adaptations. For example, cones for holding thread, turntables, handles and various objects in every day use, would be improved if the surface or a portion of the surface thereof could have a permanently heat insulated felt-like quality.

Another example, are shaped articles made from a moldable plastic composition containing an abrasive filler, which articles are subjected to this process to expose the abrasive filler.

Still another example of the use of this process is the modification of the surface to remove the glare produced by molded plastic articles by roughening the surface.

This invention comprises treating a suitable base material so as to etch, dissolve or otherwise remove the surface layer thereof and expose the filler to produce a characteristic surface. Mechanical removal of the glossy surface layer by a cutting or grinding action results in the filler being partly freed from the matrix to form a roughened surface having a feel characterized by the type of filler incorporated in the article.

As an example of the preferred process which requires no mechanical treatment and is applied to a plastic cone having a fiber filler which consists in the following steps:

(A) Attacking chemically the surface of a fiber containing plastic material to corrode or etch the base material and expose the fiber.

(B) Removing the corroded surface material and the agent used from the surface.

(C) Chemically neutralizing the action of the agent to prevent further attack.

(D) Removing the neutralizing solution and any remaining reaction products from the surface.

(E) Drying the chemically neutral product; and the article is suitable for use.

It is noted that neutralization is not required to produce the desired surface, but it is required to produce an article that is chemically stable. It has been found that plastic materials such as "Durez 1905, Durez 14,900 and BM 926," all phenolic base plastics, having such fillers as cotton flock and cotton fabric, or a mixture of flock and fabric, or wood flour, or other mineral filled phenolic base materials, have proven satisfactory.

An example of the preferred procedure according to the invention is as follows:

The materials are mixed together with a suitable lubricant or solvent and cast into the desired shape, and (Step 1) Dipped in a 25% solution of potassium hydroxide for 15 minutes at 70° F.;
(Step 2) Rinsed in running water for 20 minutes at 140° F.;
(Step 3) Dipped in 13% solution of nitric acid for two minutes at approximately 70° F.;
(Step 4) Rinsed in running hot water for 10 minutes at approximately 170° F.; and
(Step 5) Dried in any convenient manner.

While in the above example, potassium hydroxide is used, it is of course realized that sodium hydroxide could be used, or any other basic material that would attack the phenolic plastic used in casting the article so that the fibers thereof are exposed.

In the above example a 25% solution is used with a 15 minute exposure at 70° F. The amount of material that is removed depends upon various factors, and obviously a long exposure with strong base or at a high temperature would remove more of the plastic and expose more of the felt than less severe treatment. Also it is necessary to remove all of the alkali following this treatment or the plastic object will not maintain its original strength due to a continued weakening of its substance caused by the caustic solution.

It is also advantageous to rinse in the last step of this process with a sodium bicarbonate solution to remove the acid remaining from the previous step before finishing in running hot water.

While in the above example a molded plastic article containing cotton linter is treated to modify the surface by the exposure of this filler to give a soft felt-like texture, this same process may be used with many other types of filler to give a surface that is characterised by the filler and would not of necessity have a soft felt-like texture. When wood flour is used as a filler a soft abrading wheel is produced. With emery fused aluminum oxide or metallic carbides, such as tungsten grid is used as a filler an abrading wheel is produced that is characterised by the specific filler used, when the surface has been treated by this process to expose the filler. Certain articles made from plastic can be improved by modifying the surface even though no filler is used in the article, such articles as cases for business machines etc. where the glare from the molded case is objectionable, may be treated by this process to remove the glare by modifying the surface.

The invention is not restricted to chemical treatment of the surface layer to expose the fibers embedded therein as a lathe, planer, shaper, grinder or boring machine may be utilized to remove the outer skin of the molded articles, depending upon its shape, with good result, particularly when operating upon a plastic composition containing bits of textile materials.

What is claimed is:

1. A process for the production of a felt-like surface on a phenolic resin base article containing a fiber filler, which comprises etching the article with a reactant for said plastic, neutralizing the same, removing the neutralizing agent, and drying.

2. A method of producing a felt-like surface on an article cast in phenolic resin base material containing a cotton flock filler which comprises etching with a strong alkali, removing the alkali, treating with an acid, removing the acid and drying.

3. A process for the production of a felt-like surface on a phenolic resin base article containing a fiber filler which comprises the steps of treating with a 25% alkali solution for about 15 minutes at approximately 70° F., removing the alkali, treating with an acid, removing the acid and drying.

ROBERT B. BATTERSBY.

References Cited in the file of this patent

UNITED STATES PATENTS

| Number | Name | Date |
|---|---|---|
| 2,297,204 | Deissner | Sept. 29, 1942 |
| 2,324,466 | Bowen | July 20, 1943 |
| 2,448,316 | Lesavoy | Aug. 31, 1948 |